United States Patent
Ikegami et al.

(10) Patent No.: US 6,405,678 B2
(45) Date of Patent: Jun. 18, 2002

(54) GRANULAR ABSORBENT ARTICLE FOR PET ANIMALS

(75) Inventors: Takeshi Ikegami; Kengo Ochi, both of Kagawa (JP)

(73) Assignee: Uni-Heartous Corporation (JP)

( * ) Notice: Subject to any disclaimer, the term of this patent is extended or adjusted under 35 U.S.C. 154(b) by 0 days.

(21) Appl. No.: 09/891,037

(22) Filed: Jun. 25, 2001

(30) Foreign Application Priority Data

Jun. 29, 2000 (JP) ........................................ 2000-196950

(51) Int. Cl.⁷ .............................................. A01K 29/00
(52) U.S. Cl. ................... 119/171; 119/172; 119/173; 119/526; 119/54
(58) Field of Search ................. 119/171, 172, 119/173, 526, 54

(56) References Cited

U.S. PATENT DOCUMENTS

| | | | | |
|---|---|---|---|---|
| 3,980,050 A | * | 9/1976 | Neubauer | 119/1 |
| 4,311,115 A | * | 1/1982 | Litzinger | 119/1 |
| 5,100,600 A | * | 3/1992 | Keller et al. | 264/112 |
| 5,183,655 A | * | 2/1993 | Stanislowski et al. | 424/76.6 |
| 5,807,465 A | * | 9/1998 | Knapick et al. | 162/100 |
| 5,976,460 A | * | 11/1999 | Bourson et al. | 422/5 |
| 6,027,536 A | * | 2/2000 | Westerink et al. | 8/127.1 |
| 6,039,004 A | * | 3/2000 | Goss et al. | 119/172 |
| 6,089,189 A | * | 7/2000 | Goss et al. | 119/173 |
| 6,206,947 B1 | * | 3/2001 | Evans et al. | 71/63 |
| 6,235,965 B1 | * | 5/2001 | Beihoffer et al. | 604/368 |

* cited by examiner

Primary Examiner—Peter M. Poon
Assistant Examiner—Bethany L Griles
(74) Attorney, Agent, or Firm—Baker & Daniels

(57) ABSTRACT

An absorbent material for house pet animals, includes pulp fibers containing a natural or synthetic polymer and formed in a granular shape; and a solution of an amphoteric polymer having an acidic pH. The solution is added to the pulp fibers.

6 Claims, 1 Drawing Sheet

GRANULAR ABSORBENT ARTICLE FOR PET ANIMALS

CROSS REFERENCE TO RELATED APPLICATION

This application claims the priority of Application No. 2000-196950, filed Jun. 29, 2000 in Japan, the subject matter of which is incorporated herein by reference.

TECHNICAL FIELD OF THE INVENTION

The present invention relates to a granular absorbent material for use in the treatment of excrements of house pet animals.

BACKGROUND OF THE INVENTION

As an article for collecting excrements of house pet animals (mainly house cats), there has been used a plastic box in which a granule absorbent material (i.e., a cat litter) capable of absorbing excrements of pets, such as sand and bentonite, is provided. When absorbs urine from a pet (e.g., a cat), such a granule absorbent material clumps so that the urine-absorbing granules are closely contact with each other. Only the clumps of the absorbent material resulting from the urine-absorption are then removed and wasted from the box.

However, a pet owner cannot always remove the clumped absorbent material immediately after his pet defects or urinates. As a result, a problem of producing obnoxious odors from the urine or the like retained in the absorbent material remaining in the litter box may occur.

OBJECTS OF THE INVENTION

Accordingly, an object of the present invention is to provide an absorbent material for pet animals which can absorb pet urine quickly and eliminate the odors generated from the urine.

Another object of the present invention is to provide an absorbent material for pet animals which has an improved urine-absorbing efficiency.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, an absorbent material for house pet animals, includes pulp fibers containing a natural or synthetic polymer and formed in a granular shape; and a solution of an amphoteric polymer having an acidic pH. The solution is added to the pulp fibers.

According to a second aspect of the present invention, an absorbent material for house pet animals, includes a core which is made of pulp fibers containing a natural or synthetic polymer and is formed in a granular shape; a covering layer which is coated onto an outer surface of the core; and a solution added to the core, in which the solution is of an amphoteric polymer having an acidic pH.

DETAILED DISCLOSURE OF THE INVENTION

Figure 1:
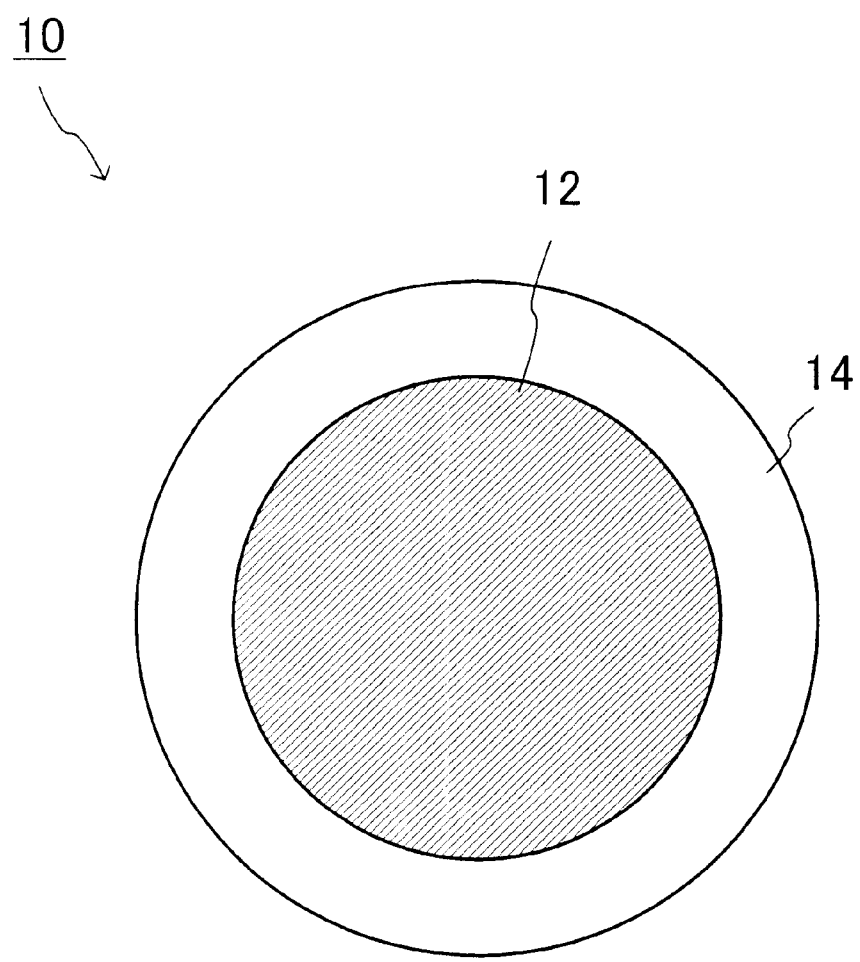
FIG. 1 is a cross sectional view showing a granular absorbent material according to an embodiment of the present invention.

In the following detailed description of the preferred embodiments, reference is made to the accompanying drawings which forma part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Hereinafter, an embodiment of the present invention will be illustrated in which a cat litter is produced, by way of example. Although, in the present invention, the shape, size and so on of the granular absorbent material (a cat litter) are limited to those specified in the embodiment, those specifications or characteristics may vary depending on the types of the pets to be treated, circumstances where the granular absorbent material is used, and so on.

FIG. 1 is a cross sectional view showing the granular absorbent material according to the embodiment of the present invention. The granular absorbent material 10 includes a core section 12 made of a pulp and a covering layer section 14 provided surrounding the core section 12. The covering layer section 14 is made of a pulp, starch and an absorbent polymer.

For the production of the granular absorbent material 10 of the embodiment, a solution of an amphoteric polymer having an acidic pH is sprayed onto the pulp of the core section 12 and a mixture of a pulp, starch and an absorbent polymer is then coated onto the surface of the pulp to form the covering layer section 14. Thus, the solution of the polymer having an acidic pH is exuded from the core section 12 to the covering layer section 14 and fixed thereto. Alternatively, the solution of an amphoteric polymer having an acidic pH may be directly sprayed onto the surface of the covering layer section 14.

The solution of an amphoteric polymer having an acidic pH to be uses as a deodorant may be a polysaccharide (i.e., a base compound) such as natural cellulose, starch and glycogen, to which at least one selected from the group consisting of a sulfone group, a carboxyl group and a phosphate group is bound.

According to the embodiment, urine is retained in the pulp through the covering layer section of the cat litter to which the solution of an amphoteric polymer is added. Alkaline substances produced from the urine such as ammonia and trimethylamine (i.e., causative substances of obnoxious odors) cause neutralization reactions with acidic functional groups of the amphoteric polymer solution added (fixed) on the core section 12 and the covering layer section 14 to eliminate the odors. In addition to the odors caused by alkaline substances, urine may also generate odors caused by acidic substances such as fatty acids and sulfides to a small extent. The odors caused by acidic substances can also be eliminated by the neutralization of such substances with the basic functional groups in the amphoteric polymer solution.

In addition, the acidic polymer solution added onto the covering layer section contains a sulfone group, a carboxyl group and/or a phosphate group. Such a functional group serves as a surfactant so as to render the covering layer section hydrophilic. As a result, urine can be absorbed into the pulp fibers quickly.

There has been described above a specific embodiment in accordance with the present invention. However, it will be appreciated that the invention is not limited thereto, and it is to be understood that modifications will be apparent to those skill in the art without departing from the spirit of the invention.

As described above, according to the present invention, excrements such as urine can be absorbed quickly and odors generated from urine or the like can be eliminated. In addition, the urine-absorbing efficiency can be improved.

What is claimed is:

1. An absorbent material for house pet animals, comprising:
   a core which is made of pulp fibers containing a natural or synthetic polymer and is formed in a granular shape; and
   a solution of an amphoteric polymer having an acidic pH, wherein
   the solution is added to the pulp fibers.

2. An absorbent material according to claim 1, wherein the solution is sprayed onto the pulp fibers.

3. An absorbent material according to claim 1, wherein
   the solution comprises a polysaccharide such as a natural cellulose, starch and glycogen to which at least one selected from the group consisting of a sulfone group, a carboxyl group and a phosphate group is bound.

4. An absorbent material for house pet animals, comprising:
   a core which is made of pulp fibers containing a natural or synthetic polymer and is formed in a granular shape;
   a covering layer which is coated onto an outer surface of the core; and
   a solution added to the core, in which the solution is of an amphoteric polymer having an acidic pH.

5. An absorbent material according to claim 4, wherein
   the covering layer comprises a mixture of a pulp, starch and an absorbent polymer.

6. An absorbent material according to claim 5, wherein the solution is also added to the covering layer.

\* \* \* \* \*